United States Patent [19]
Vogelgesang et al.

[11] 3,828,359
[45] Aug. 6, 1974

[54] TEMPLATE FOR A GRAPHIC FORMING DEVICE
[75] Inventors: Peter J. Vogelgesang, Roseville; Jerry L. Alexander, St. Paul Park; Frank C. Lunquist, New Brighton, all of Minn.
[73] Assignee: Minnesota Mining and Manufacturing Company, St. Paul, Minn.
[22] Filed: Dec. 26, 1972
[21] Appl. No.: 318,256

[52] U.S. Cl. .................................................. 95/85
[51] Int. Cl. ........................................... B41b 17/32
[58] Field of Search ....... 250/216, 218, 219; 95/4.5, 95/85

[56] References Cited
UNITED STATES PATENTS
2,701,991  2/1955  Croucher .............................. 95/4.5

Primary Examiner—John M. Horan
Attorney, Agent, or Firm—Alexander, Sell, Steldt & DeLaHunt

[57] ABSTRACT

A template useful in a device for forming visible graphics on a radiation activated composite strip material. The template comprises a radiation transmissive supporting member with a thin highly reflective coating. The coating has at least one sharply defined opening to define a window corresponding to a graphic to be formed through which window the strip material may be irradiated in a graphic pattern. The coating may also have an opening to afford viewing the portion of the strip material adjacent the window to facilitate spacing graphics sequentially formed along the strip material.

17 Claims, 12 Drawing Figures

TEMPLATE FOR A GRAPHIC FORMING DEVICE

CROSS REFERENCE TO RELATED APPLICATIONS

This application is related to U.S. Pat. applications Nos. 318,257 and 318,258, both filed Dec. 26, 1972.

FIELD OF THE INVENTION

This invention relates to a template used in a device for serially forming graphics in spaced relationship along a strip material by exposing the strip material to radiation through a radiation transmissive window in the template.

BACKGROUND OF THE INVENTION

Known prior art templates for use in a device for serially forming graphics such as letters in a strip material are in the form of a belt or a disk having at least one light transmissive window. The window is defined by an opening or openings through the template, or by photographic negatives mounted in the template. The template is mounted on the device with the window registered at an exposure station over a portion of the strip material, and the material is light exposed through the window to form a graphic. In one known device the exposed coating changes color and in another the coating is photographic.

Proper spacing is important between the letters of words formed by a device utilizing such a template to provide the most aesthetically pleasing appearance for the words. Allowing an area of equal width for each letter, as is done by the typewriter, either restricts the style of the letters used to one in which all letters are of the same width, or causes certain words to appear disjoined at narrow letters such as an I. Additionally, certain combinations of letters such as AT or LY may, with many styles of letters, require no spacing or even an overlap for a proper appearing relationship.

The spacing between the letters of words formed by the aforementioned devices is determined by the distance the strip is advanced past the exposure station subsequent to each exposure via the operators use of an advancing mechanism incorporated in the device. Known prior art advancing mechanisms include a non-automated type in which manual rotation of a member causes corresponding movement of the strip. The operator of the device may advance the strip to obtain any desired spacing between letters, but is guided to obtain a desired spacing only by visual reference to the previously formed letters. Some more automated manually operated advancing mechanisms are also known which, upon operation, advance the strip material a predetermined distance to provide the spacing between adjacent letters. One type advances the strip a uniform distance for any letter, while another advances the strip a distance proportional to the width of the letter just formed to provide a uniform spacing between all adjacent letters.

The automated advancing mechanisms are complex and expensive, and known automated mechanisms do not provide for letter combinations which require no spacing. The known non-automated advancing mechanisms, which afford the operator unlimited versatility in adjusting spacing between various letter combinations, require a highly developed ability to judge distance.

SUMMARY OF THE INVENTION

A template according to the present invention is useful in a device for exposing a novel composite strip material on which a graphic is visibly formed by radiation heating in accordance with a received pattern of momentary intense radiation. The template efficiently reflects all but a sharply defined pattern of intense radiation directed toward the strip material by the device and affords such high resolution for a graphic formed in the strip material that even half-tone photographs may be reproduced.

The template comprises a radiation transparent supporting member having a thin highly reflective coating with at least one sharply defined opening in the shape of a graphic to be formed to provide a radiation transmissive window through the template.

The strip material comprises a receiving web carrying a firmly adhered layer of waxy material and a donor web carrying a lightly adhered layer of microgranules in face-to-face contact with the layer of waxy material. At least one of the layers bears a radiation absorbing pigment. The device registers the template window over a portion of the strip material, and directs momentary intense radiation toward the template. The pigment in the strip material momentarily heats and softens the waxy material in accordance with the pattern of radiation received through the window. The waxy material adhere to the microgranules upon solidification, and when the webs are separated, the solidified waxy material removes microgranules from the layer of microgranules to form a graphic corresponding to the window on the receiving web.

A xenon flash lamp, which produces broad spectrum bluish white light in a flash having a duration of under about 3 milliseconds, is preferred for providing the radiation. The minimum radiant energy from the xenon lamp required to form a graphic on the strip material (and which must be blocked by the reflective coating on the template) is approximately 5 watt seconds per square inch of exposed strip material, with a preferred radiant energy being above 50 watt seconds (e.g. 25,000 watts for 2 milliseconds) per square inch of exposed strip material.

The xenon flash lamp does not provide a point source of radiation. Thus the device presses the reflective coating on the template into intimate contact with the strip material to provide optimum edge resolution in the pattern of radiation received by the pigment. Since the coating is highly reflective, it may be very thin (i.e. under 0.001 inch), so that the transparent member will provide support in the window to limit deformation of the strip material pressed against the window, (which deformation might otherwise decrease the resolution of the graphics,) and yet the coating will not be heated sufficiently by any blocked radiation which might otherwise partially soften the waxy material in nonirradiated areas. Preferably the coating is of metal and has a smooth surface adjacent the supporting member to provide specular reflection of the radiation. A bright copper reflective coating has been found suitable for use when the xenon flash lamp provides flux densities of up to 100,000 watts per square inch of exposure area, while a bright aluminum reflective coating, which has a reflectivity of over 88 percent for most of the wavelengths of light produced by the xenon flash lamp, has been found suitable where the radiation may be more intense.

A template according to the present invention provides unlimited versatility in the shape of graphics which may be formed. The radiation transparent supporting layer provides support for non-interconnected portions of the reflective coating on the template as is required to form the centers of letters such as O or A, and to reproduce half-tone photographs in which the shading effect is produced by differentially sized non-interconnected dots of the reflective coating.

Also, the template according to the present invention may provide a novel indexing means for accurately indicating to the operator the position to which the strip material should be advanced by a non-automated drive mechanism on the device to space a newly formed visible graphic at a predetermined distance from the next graphic to be formed without the necessity for the operator to estimate distances.

The novel indexing means afforded by the template comprises a viewing opening in the reflective coating closely adjacent one side of the graphic shaped window, and at least one mark within the viewing opening spaced a predetermined distance from the window. The template is adapted to be mounted on the device with the extremity of the graphic shaped window adjacent the viewing opening located at a predetermined imaginary line transverse to the strip material at an exposure station on the device. Subsequent to the formation of a graphic, and before the window is moved from the exposure station, the strip may be advanced by the drive mechanism so that a portion of the visible graphic just formed is aligned with the mark in the opening to provide the proper spacing from the next graphic formed through a template window which will also be positioned with its adjacent extremity on the imaginary predetermined line. The template may also have a second mark for similar alignment with a formed graphic to provide no spacing from the next graphic. Skilled users of the device will be able to make other spacing adjustments as desired based on the first and second marks, and smaller graduations may be provided for assistance.

BRIEF DESCRIPTION OF THE DRAWING

The invention will be further described with reference to the accompanying drawing wherein like numbers refer to like parts in the several views, and wherein.

DESCRIPTION OF THE PREFERRED EMBODIMENT

Figure 1:
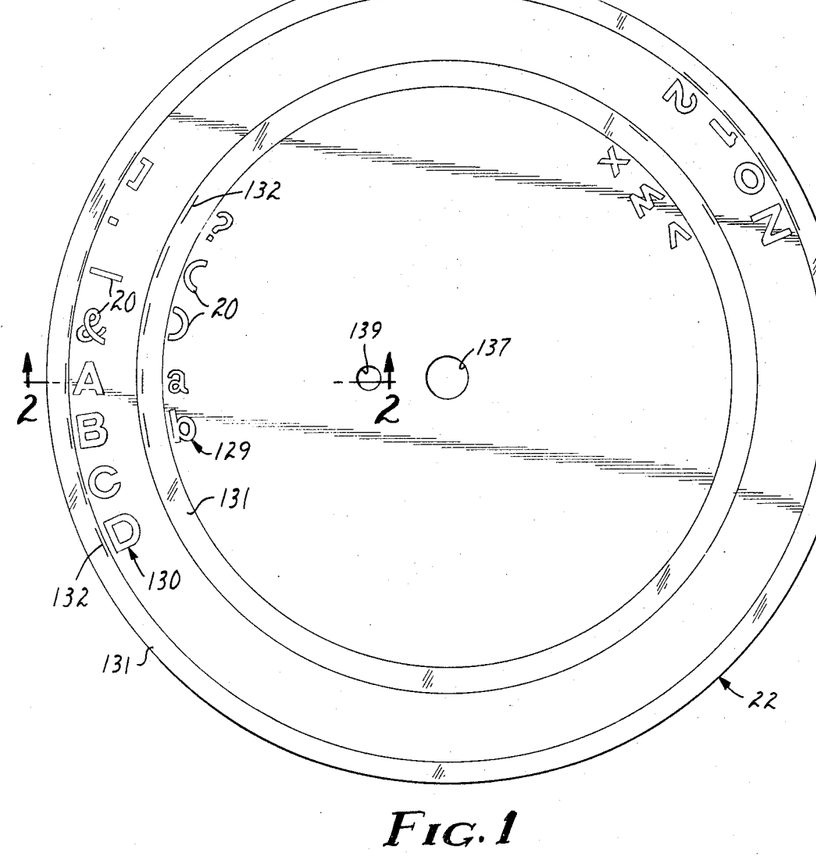
FIG. 1 is a plan view of a first embodiment of a template according to the present invention.
Figure 3:
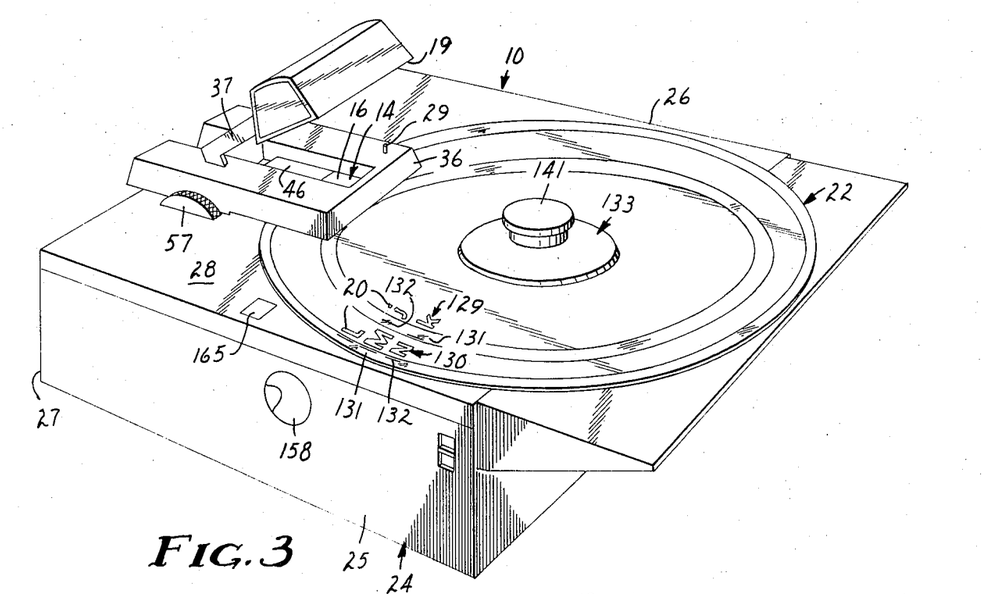
FIG. 3 is a perspective view of a device for forming graphics utilizing the template according to the present invention shown in FIG. 1.

Referring now to the drawing there is shown in FIG. 3 a device 10 for forming graphics, which utilizes a first embodiment of a template according to the present invention, which template is best seen in FIG. 1, and is generally designated by the numeral 22. The device 10 is useful for forming graphics on a composite strip material 12 of the type previously described, and which is more fully described in U.S. Pat. application No. 318,258, filed on Dec. 26, 1972, attorney docket No. 28,016 the disclosure whereof is incorporated herein by reference.

The device 10 is more fully described in U.S. Pat. application No. 318,258, filed on Dec. 26, 1972 attorney docket No. 28,038, the disclosure whereof is incorporated herein by reference. Briefly, the device 10 includes means for defining an exposure station 14 including a generally rectangular transparent plate 16, and means adapted for positioning a predetermined portion of the composite strip material 12 under the plate 16 including means for driving the composite strip material 12 along a path from a supply cartridge 17 past the exposure station 14. Graphics are formed on the strip 12 by irradiating means for exposing the portion of the composite strip material 12 which is located under the transparent plate 16 to radiation in the pattern of a graphic to be formed. The irradiating means comprises a radiation means or light source 19 for briefly irradiating the strip material 12 with intense illumination through one of a plurality of radiation transmissive windows 20 in the reflective template 22 according to the present invention.

The device 10 includes a main frame 24 having a front wall 25, a rear wall 26, a first end wall 27 in which an outlet opening for the strip material is located, and a top wall 28 having a generally planar surface portion on which the template 22 is movably supported.

A portion of the template 22 projects between a second support member 35 mounted in the top wall 28 of the frame 24 and the cantilevered end of a first support member 36 in which the transparent plate 16 is mounted to afford alignment of a window 20 in the template 22 between the transparent plate 16 and the strip material 12 at the exposure station 14. The light source 19 is a xenon flash lamp having a suitable power supply and being supported in the distal end of an arm 37 mounted by a pin 38 on the first support member 36 for pivotable motion between a normal position (FIG. 5) to which the lamp arm 3 is biased by a pair of spaced springs 39 with the light source 19 spaced from the transparent plate 16, and an expose position (FIG. 6) with the light source 19 adjacent the transparent plate 16 at which the light source 19 will be flashed to expose the strip material 12 through a window 20 in the template 22 when a microswitch 33 in the lamp arm 37 is closed by contact with a pin 29 projecting from the top wall 28.

Figures 5, 6:
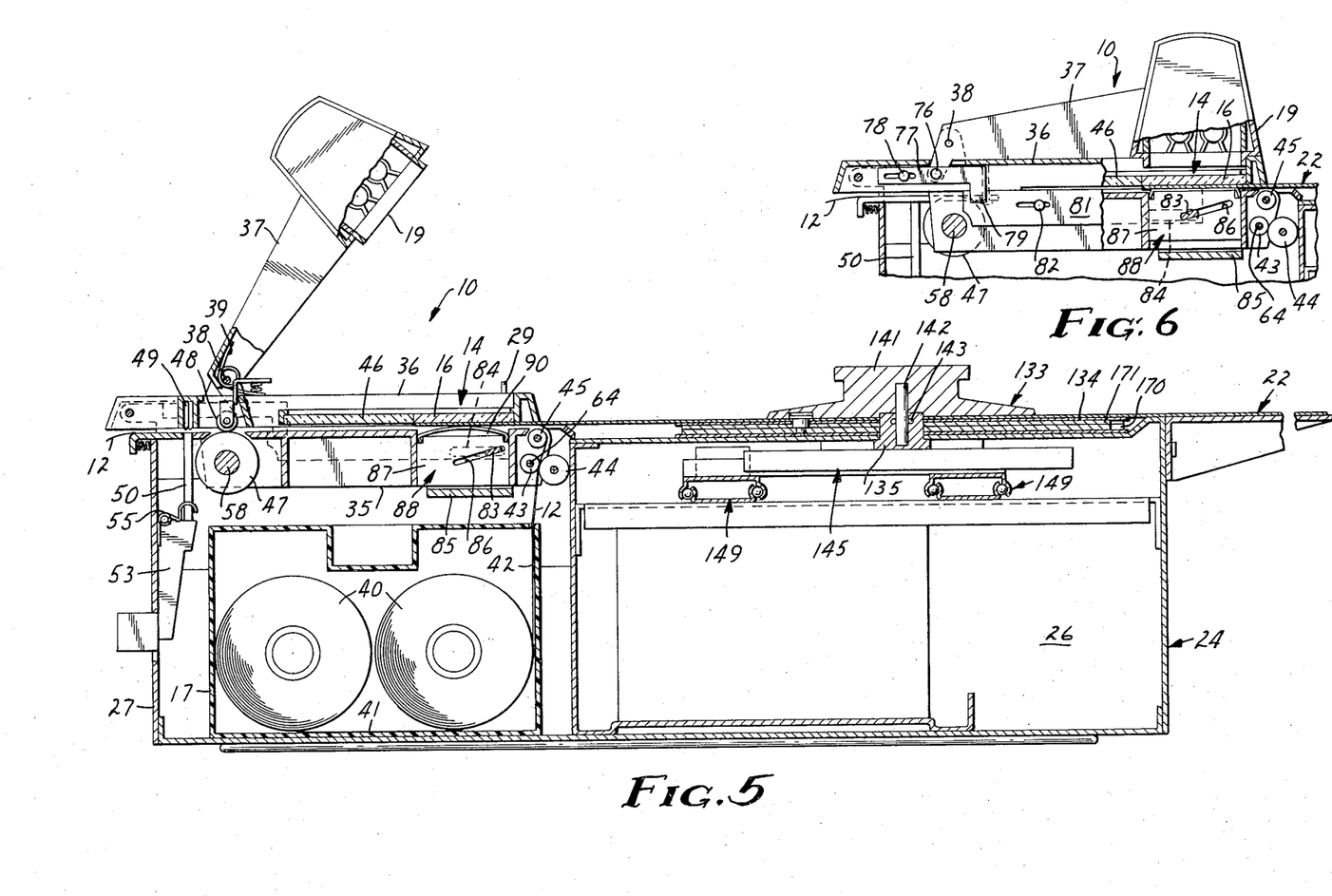
FIG. 5 is a longitudinal vertical sectional view taken approximately along the line 5—5 of FIG. 4.
FIG. 6 is a fragmentary sectional view taken approximately along the line 6—6 of FIG. 4, with a movable arm supporting a light source shown in an expose position.
Figure 7:
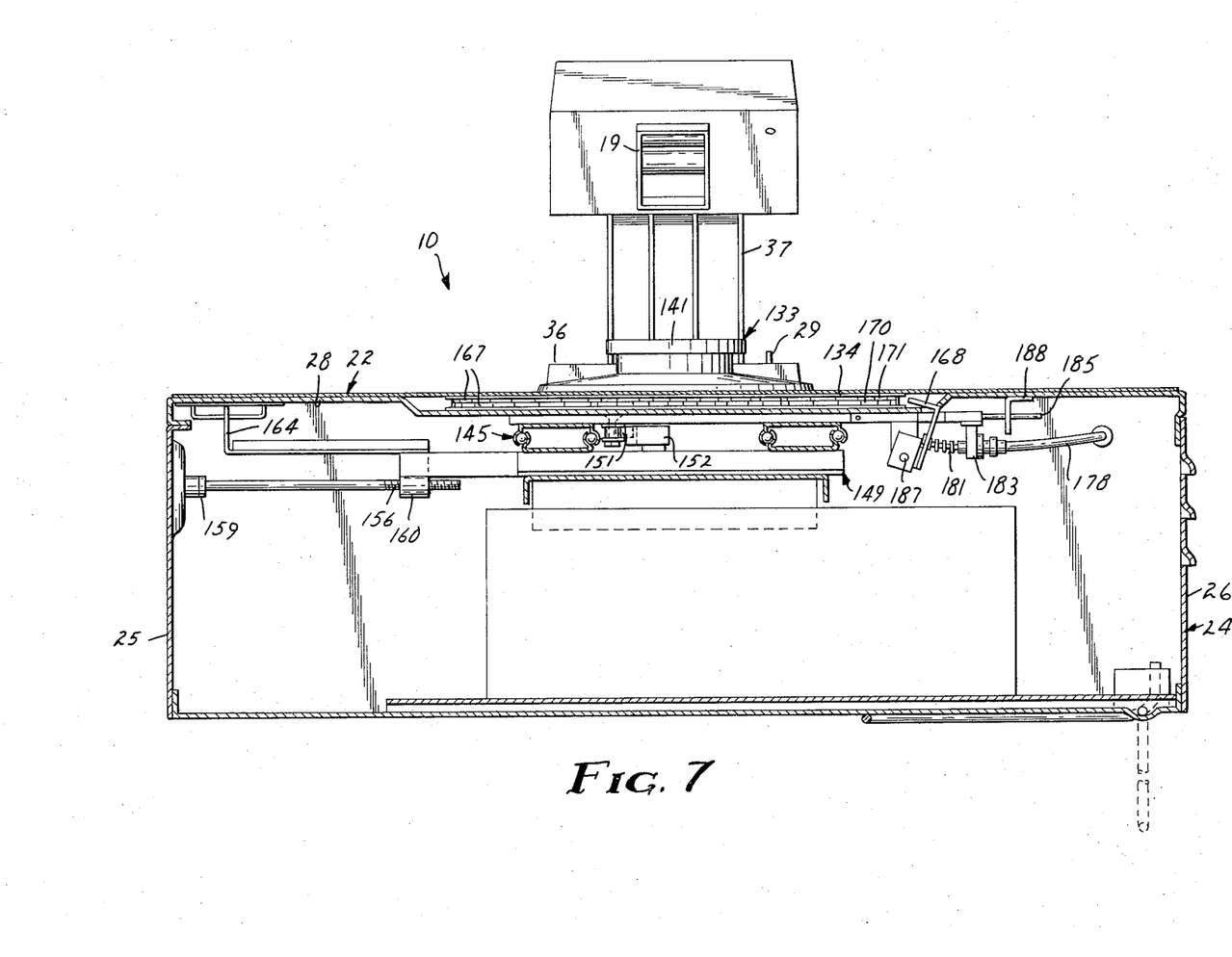
FIG. 7 is a vertical cross sectional view taken approximately along the line 7—7 of FIG. 4.

The device 10 includes means for defining a path for the strip material 12 through the exposure station 14 best seen in FIG. 5. The composite strip material 12 comprises two separate coated webs, each stored in wrapped condition on a separate reel 40 within the cartridge 17. The webs include a receiving web 41 having a layer of waxy material firmly adhered to one surface, and a doner web 42 having a releasably adhered layer of microgranules. The webs 41 and 42 extend through an outlet slot in the cartridge 17 with the layer of waxy material and layer of microgranules in face-to-face contact. The composite strip 12 is guided through the nip between a first driven roller 43 and an idler roller 44, around a guide roller 45 and across the exposure station 14 adjacent the portion of the template 22 beneath the transparent plate 16. From the exposure station 14 the strip material 12 extends along an area at which newly formed graphics (which are visible on the outer surface of the composite strip material 12) may be viewed by an operator through a glass 46 mounted in the first support member 36 abutting the transparent plate 16 and a viewing area adjacent each window 20 in the template 22. This allows the operator to check the sequence of graphics formed along the strip material 12 and facilitates operation of the means for providing a desired spacing between adjacent graphics as will be explained later. Next the strip material 12 extends between a second driven roller 47 and an idler roller 48 and out of the outlet opening in the first end wall 27 through a means for severing the composite strip material. The severing means comprises a knife blade 49 on the first support member 36 spaced across the path for the strip material 12 from an anvil plate 50 movable by manual movement of an arm 53 against the bias of a spring 55 to press the strip material 12 along the path into severing engagement with the knife 49.

Figure 4:
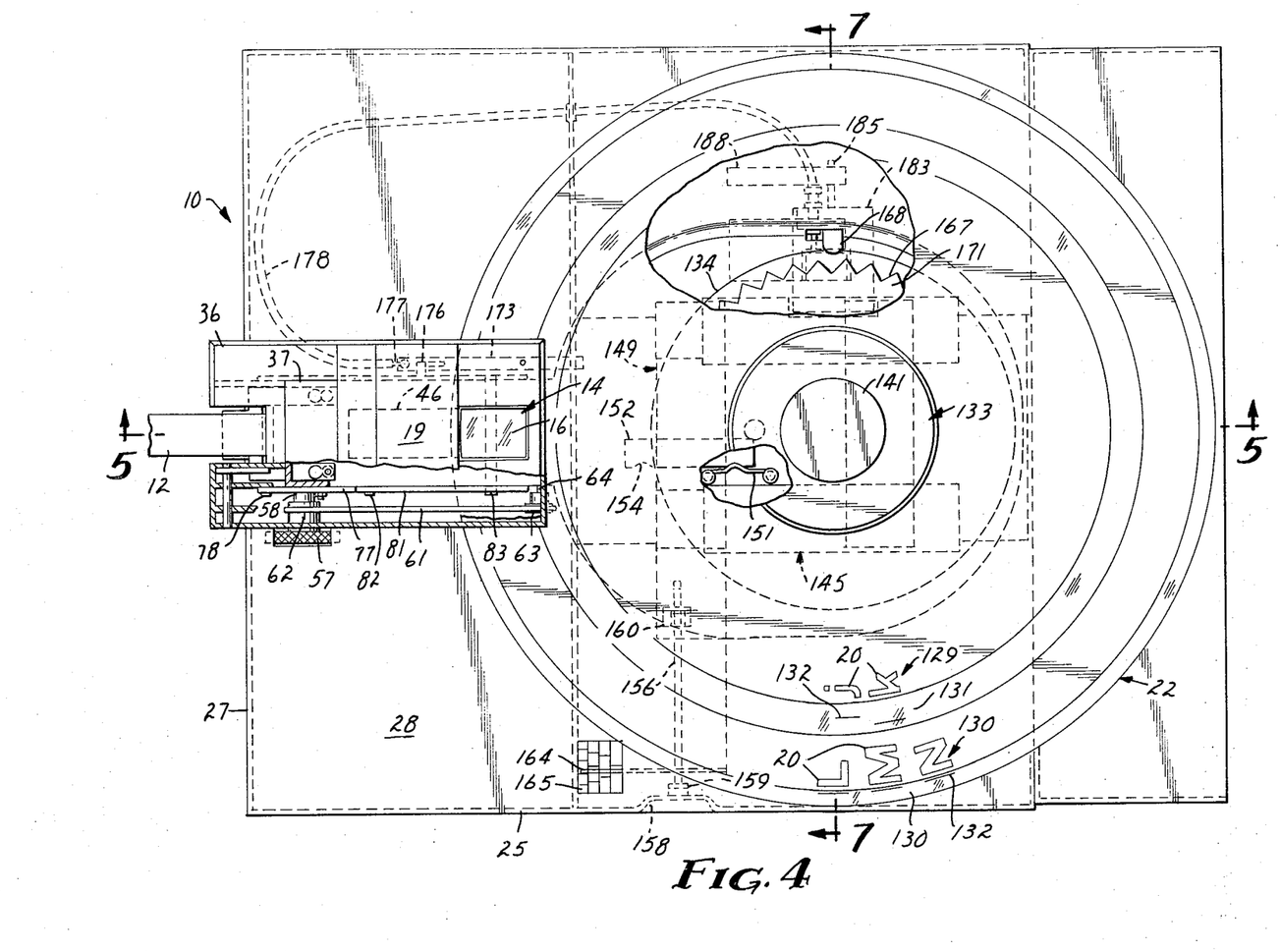
FIG. 4 is a plan view, of the device shown in FIG. 3, with certain parts broken away and sectioned to show structural detail.

The means for driving the strip material 12 along the path, best seen in FIG. 4, is operated by a knurled wheel 57 having a manually engageable portion projecting above the top wall 28 of the frame 24 and being attached to a rotatable shaft 58 carrying the second driven roller 47. A drive belt 61 extends between a pulley 62 attached to the shaft 58 and a pulley 63 coupled to a shaft 64 carrying the first driven roller 43. Thus, manual rotation of the knurled wheel 57 in either direction will drive the strip material 12 along the path via the driven rollers 43 and 47.

The irradiation means also includes clamping means at the exposure station 14 adapted for releasably clamping the template 22 in intimate engagement with the composite strip material 12 and for pressing the webs 41 and 42 of the composite material 12 into contact during operation of the light source 19 to form a graphic on the strip material 12.

The clamping means comprises the transparent plate 16, and a plunger assembly 88 slidably mounted in an opening in the second support member 35 for movement generally normal to the transparent plate 16. The clamping means also includes means coupled between the lamp arm 37 and the plunger assembly 88 and responsive to manual movement of the lamp arm 37 from the normal to the expose position for moving the plunger assembly 88 from a release position spaced from the transparent plate 16 to afford free movement of the template 22 and strip material 12 relative to the exposure station 14, to a clamping position with the plunger assembly clamping the portions of the strip material 12 and template 22 at the exposure station 14 against the transparent plate 16.

The end of the lamp arm 37 pivotally mounted on the pin 38 has spaced projections 75 each pivotally attached at a pin 76 to a first drive rod or link 77 slidably mounted at a slot on a pin 78 projecting from the first support member 36. The pair of parallel first drive links 77 each has an end 79 and adapted for engagement in a slot in a second drive rod or link 81 mounted at a slot for reciprocal motion on a pin 82 projecting from the second support member 35. The parallel pair of second drive links 81 are connected at their ends opposite the slots 80 by a drive pin 83 guided for sliding movement along a path parallel to the surface of the top wall 28 in a slot 84 formed in a bracket 85 fixedly attached to the second support 35. The drive pin 83 also slidably engages a cam slot 86 in a plug 87 of a plunger assembly 88 mounted in an opening in the second support member 35 for sliding movement in a direction generally normal to the direction of movement of the drive links 77 and 81. The cam slot 86 is angularly disposed with respect to the direction of motion of the drive links 77 and 81, so that movement thereof in response to movement of the arm 37 between the normal and the expose position provides corresponding movement of the plunger assembly 88 between a release position with an adjacent arcuate surface 90 spaced from the transparent plate 16 to afford free movement of the template 22 and strip material relative to the exposure station 14 (FIG. 5), and an engaged position with the surface 90 clamping the length of the strip material 12 and the portion of the template 22 at the exposure station 14 into engagement with the transparent plate 16 (FIG. 6).

Figure 2:
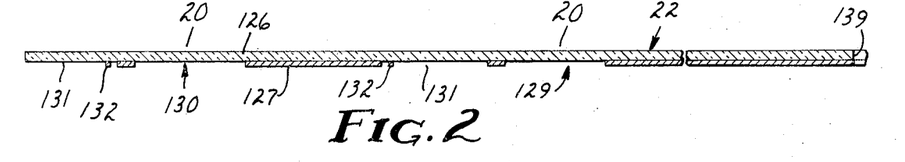
FIG. 2 is an enlarged vertical sectional view taken approximately along line 2—2 of FIG. 1.

As is best seen in FIGS. 1 and 2 the template 22 according to the present invention is formed of a thin radiation transparent supporting member 126 having a highly reflective coating 127. The coating 127 has sharply defined open areas corresponding in shape to graphics to be formed, which open areas define the radiation transmissive windows 20 through the template 22. The windows 20 are spaced in inner and outer concentric circular arrays 129 and 130 respectively. The coating 127 also has two concentric annular openings 131 which provide the viewing area adjacent each window 20. The annular openings 131 afford visual inspection of the portion of the strip material 12 positioned along the path under the glass 46 just subsequent to the exposure station 14, as may be desirable to insure a proper sequence of graphics. Also, the annular openings 131 each have at least one specially positioned mark 132 adjacent each window 20 which provide a portion of a novel means for determining the proper spacing between adjacent graphics along the strip material 12 as will be explained later.

The windows 20 may be in the form of letters, numbers, symbols or pictures including half-tone photographs. The device 10 provides image resolution in graphics formed on the strip material 12 of over 200 lines per inch. One desirable combination of graphics for a template 22 includes all of the letters (both lower and upper case) the numbers, and the punctuation in a given style and point size, which will allow complete printing of a desired message without changing the template 22. Preferably the upper case letters are positioned in the outer array 130 because of their greater average width, with the corresponding lower case letters being positioned in the inner array 129.

When the windows 20 correspond to letters, numbers or punctuation intended to be formed along an imaginary base line on the strip material 12, the windows 20 in each array 129 or 130 are oriented with their imaginary base line portions spaced at equal intervals, and with the imaginary base line portion of each window 20 on the template 22 parallel to and spaced a uniform distance in a common direction from a radius of the template 22. With this relationship, the base line portion for each window 20 at the exposure station 14 will be positioned at a common line parallel to the strip material so long as the radius parallel to the base line of that window 20 is parallel to the path of the strip material 12, and the center of the template 22 is not moved along a line normal to the path of the strip material 12.

"Imaginary base line" as used herein is a term of art in the printing industry, and refers to the common line generally along the bottom edge of numbers, upper case letters, and the lower case letters except those which extend into the descender space and have the bottom edge of their upper portion positioned on the imaginary base line such as $g$, $p$, $q$, and $y$. The term "imaginary base line portion" refers to that portion of such an imaginary base line which extends laterally beneath each graphic.

The windows 20 in each array 129 or 130 are oriented so that the intersection between an imaginary line perpendicular to the base line portion for each window 20, which imaginary line contacts the left extremity of the window 20 and the radius parallel to the base line for that window, is spaced the same distance from the center of the template 22. This relationship is important to the operation of means for allowing the operator to establish a predetermined spacing between graphics formed along the strip material which will be explained later.

The template 22 preferably is made by a known photographic technique using a transparent supporting member 126 consisting of a sheet of 0.018 cm (0.007 inch) thick photographic grade polyester which is free of all defects such as air bubbles. The highly reflective coating 127 is a bright metal such as copper or aluminum which is applied to one surface of the sheet of polyester by vapor coating. The reflective coating 127 must have sufficient thickness to be opaque to visible light, while being sufficiently thin that it will flex and adhere well to the transparent layer 126. Vapor coated layers in the range of 5,000 Angstroms (0.00005 cm) thick for copper and aluminum have been found suitable. A coating of photographic resist is applied over the metallic coating. Preferably a 0.0018 cm (0.0007 inch) layer of the photographic resist such as that sold under the trade name of "Dynachem Laminar R" is adhered via an adhesive coating to the metallic coating by applying heat and pressure in a commercial laminating machine. Alternatively, a photo resist such as that commercially known as "Eastman KPR Photoresist" can be used. A photographic film having black images corresponding to the areas to be removed from the metallic coating is prepared in a conventional manner as by photographing a printed sheet. The negative is pressed against the layer of photographic resist, and the composite is then flooded with ultraviolet light which exposes all areas of the resist except those covered by the dark areas of the negative. The photographic resist is then processed by applying 1, 1, 1, Trichlorethane as by spraying or immersion, which washes away all portions of the resist not exposed to the ultraviolet light (i.e., in the areas covered by the dark portion of the negative during exposure). The composite is then immersed in an aqueous solution of ferric chloride which will etch away the metallic coating exposed by the openings in the resist, leaving sharply defined openings in the metallic coating corresponding to the dark portion of the negative. The developed resist on the remaining metallic coating provides abrasion and corrosion protection for the bright metallic coating. The circular template 22 is then cut from the sheet of polyester.

The device 10 includes means for registering a window 20 at a predetermined position at the exposure station including graphic selection means for moving a selected one of the windows 20 on the template 22 to the exposure station 14 with its upper portion adjacent the rear wall 26 and its base line portion along a predetermined line parallel to the path for the strip material 12; and vertical alignment means for adjusting the predetermined line at which the imaginary base line portions of windows at the exposure station are located with respect to the width of the strip material 12.

The graphic selection means includes means for affording rotational movement of the template 22 on the device 10 to position at the exposure station 14 any of the windows 20 in the array 129 or 130 which is aligned with the exposure station 14, and means for affording lateral movement of the template 22 to align either the inner or the outer circular array 129 or 130 of windows 20 with the exposure station 14.

Referring now to FIG. 5, the device 10 supports the template 22 on a turntable 134 rotatably mounted on a bearing assembly 135 with the outer surface of the turntable 134 coplanar with the adjacent template supporting surface of the top wall 28.

The turntable 134 has a central hub adapted to closely engage a centrally located mounting hole 137 in the template 22, and a radially spaced locating pin adapted to closely engage a locating hole 139 in the template 22.

A removable knob 141 retains the template 22 on the turntable 134 and affords manual movement of the turntable 134 to position a selected window 20 in the template 22 at the exposure station 14. An axially projecting pin 142 on the knob 141 is sized for axial sliding movement within a centrally axially extending hole in the turntable hub between an engaged position for the knob 141 with an arcuate spring 143 retained in the hub in releasable engagement with a groove in the pin 142, and a release position with the knob 141 separated from the turntable 134 to afford replacement of the template 22. In the engaged position the flange of the knob 141 presses the template 22 against the turntable 134 and receives the locating pin in an opening to provide rotational driving engagement between the knob 141 and the turntable 134.

The means for affording lateral movement of the template 22 to provide alignment of either the inner array 129 or the outer array 130 of windows 20 with the exposure station includes a first parallel pair of drawer slides 145. The bearing assembly 135 for the turntable 134 is supported on the drawer slides 145 for movement parallel to the path of the strip material 12, between a first position at which the outer circular array of windows 130 is aligned with the exposure station 14, and a second position at which the inner circular array of windows 129 is aligned with the exposure station 14. The first and second positions of the turntable assembly are determined by engagement of an arcuate portion of a spring arm 151 with spaced notches 154 in a bar 152. The bar 152 is mounted on one of a second parallel set of drawer slides 149 supporting the first set of drawer slides 145 and oriented to provide the vertical alignment means for adjusting the predetermined line at which the imaginary base line portions of windows 20 at the exposure station 14 are located with respect to the width of the strip material 12, which means is useful so that more than one line of printing may be formed along the composite strip material 12.

The vertical alignment means comprises a knob 158 attached to an end of a threaded shaft 156 rotatably mounted in the front wall 25, and which is prevented from axial movement by a thrust collar 159. The shaft 156 threadably engages a nut 160 attached to the turntable bearing assembly 135 so that manual rotation of the knob 158 will cause movement of the turntable 134 and template 22 normal to the path for the strip material 12.

The position that a line of graphics will be formed with respect to the width of the strip material 12 is indicated to the operator for each setting of the lead screw assembly by the position of a thin blade 164 attached to the turntable bearing assembly with respect to marks on a transparent dial plate 165 mounted in the top wall 28. For example, the blade 164 is aligned on with the line centered on the dial plate 165 to center a graphic on the strip material 12, and is aligned with one of two lines trisecting the dial plate 165 to center a graphic in either the upper or the lower half of the strip material 12.

The means for registering a window 20 at the exposure station 14 also includes means for precisely aligning a window 20 at the exposure station 14 with its imaginary base line portion parallel to the path of the strip material 12 upon movement of the lamp arm 37 to the expose position to fire the light source 19. Inner and outer sets of V-shaped notches 167 are positioned around the turntable 134 in predetermined relationships with respect to the windows 20 in the template 22. A locating pawl 168 is coupled to the lamp arm for movement into engagement with an adjacent notch 167 to rotate the turntable 134 as required for precise location of a window 20 at the exposure station 14 upon movement of the lamp arm 37 to the expose position.

The outer set of notches 171 correspond in number to, and are equally spaced at the same angle as the imaginary base line portions for adjacent windows 20 in the outer array 130, while the inner set of notches 170 correspond in number to and are equally spaced at the same angles as the imaginary base line portions for adjacent windows 20 in the inner array 129. The windows 20 in a template 22 mounted on the turntable 134 are positioned in a predetermined relationship with the notches 167 by engagement of the locating pin with the locating hole 139 in the template 22 to precisely position a window 20 at the exposure station 14 with its imaginary base line portion parallel to the path of the strip material 12 when the pawl 168 engages a notch 170.

The coupling between the pawl 168 and the lamp arm 37 comprises a bar 173 slidably mounted in a recess in the top wall 28 and having an opening adapted to be engaged by a projecting arm 176 attached to the adjacent second drive rod 81. A cable 177 housed in a flexible shield 178 secured at one end to the frame 24 is attached between the bar 173 and the pawl 168.

Movement of the lamp arm 37 to the expose position affords firm engagement of the pawl 168 in an adjacent notch 167 under the influence of a spring 181 to rotate the turntable and align the window 20 at the exposure station 14, whereas movement of the lamp arm 37 to its normal position retracts the pawl 168 from the adjacent notch 167 and affords free rotation of the turntable 134.

The pawl 168 is supported on a base plate 183 pivotally attached to the bearing assembly 135. The pawl 168 is pivotably mounted on the base plate about a pin 187 to afford engagement of the pawl 168 with the adjacent notch 167.

A pin 185 projecting from the end of the base plate 183 is slidably supported on a cam member 188 attached to the top wall 28. The supporting surface of the cam member 188 is inclined with respect to the top wall 28 so that movement of the turntable assembly 133 between its first and second position will cause corresponding pivotal motion of the base plate 183 between a position with the pawl 168 aligned for engagement with the outer set of notches 171, and a position with the pawl 168 aligned for engagement with the inner set of notches 170.

Figure 8:
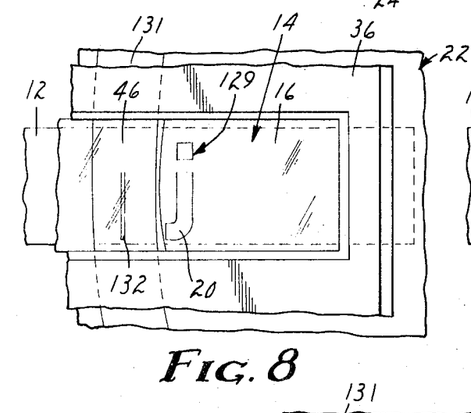
FIGS. 8 through 10 are enlarged fragmentary detail views of the exposure station of the device of FIG. 3, sequentially illustrating use of indexing means on the template of FIG. 1.
Figure 9:
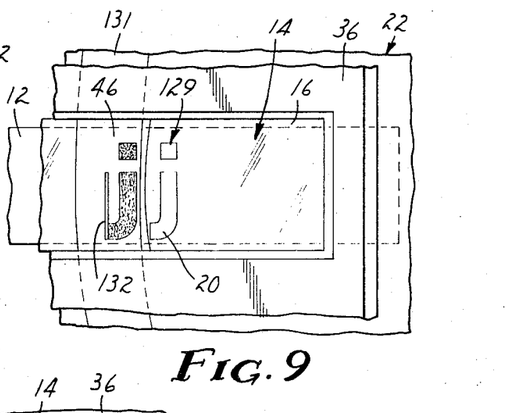
Figure 10:
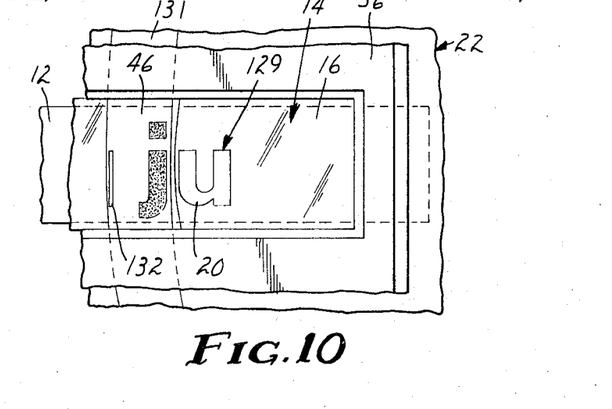

The template 22 also provides a novel means for allowing the operator to establish a predetermined desired spacing between graphics formed along the strip material 12, the operation of which is sequentially illustrated in FIGS. 8 through 10. As was previously stated, a line perpendicular to the imaginary base line portion of a window 20 and contacting the left or radially outward extremity thereof will intersect the radius to which the imaginary base line portion is parallel at a uniform distance from the center of the template 22 for all the windows 20 in each of the circular arrays 129 or 130. Also, the left extremity of each window 20 thus defined in the inner array 129 is spaced from the left extremity of each window 20 in the outer array 130 by a distance equal to that between the first and second position of the turntable assembly 133 as established by the distance between the notches 154 in the bar 152. Thus, the left extremity of any window 20 at the exposure station 14 will be positioned at a common imaginary line transverse of the strip material 12 along the path. As previously mentioned, the viewing area provided by the annular opening 131 adjacent each window 20 has at least one mark 132 spaced a predetermined distance from that window 20. Depending on the width of the window 20, the mark 132 may be spaced from the left extremity of a window 20 by a predetermined distance equal to the horizontal width of the window 20 plus a predetermined spacing desired between adjacent graphics formed along the strip material 12, or a distance equal only to the predetermined desired spacing.

Subsequent to forming a graphic and before the template 22 is moved to position the window 20 corresponding to the next graphic to be formed at the exposure station 14 (FIG. 8), the operator advances the strip material 12 via the knurled drive wheel 57 to align a portion of the newly formed graphic with the mark 132, such as its left extremity for the mark spacing illustrated in FIG. 9. This will provide the predetermined spacing between the graphic just formed and the next graphic to be formed via the device 10 (FIG. 10). A second mark may also be provided in each viewing area which is spaced from the left extremity of a window 20 by a distance equal to the width of the graphic (not illustrated). Such a mark will afford positioning a visible graphic just formed on the strip material 12 so that no horizontal spacing will be provided between it and the next graphic to be formed as may be desirable for letter combinations such as AT. Smaller graduation marks may also be provided to afford squeezing or expanding the length of a row of graphics as desired by the operator.

Figure 11:
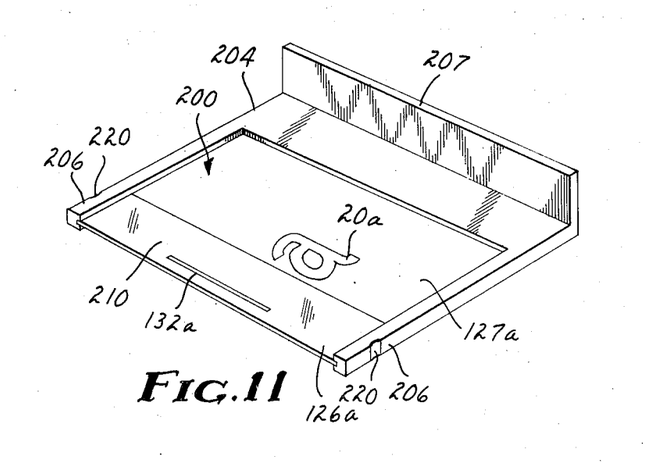
FIG. 11 is a perspective view of a second embodiment of a template according to the present invention.

Referring now to FIG. 11 there is shown a second embodiment of a template according to the present invention generally designated by the numeral 200. The template 200 is adapted for use in a device 202 illustrated in FIG. 12. The template 200 and device 202 have portions or parts which are similar to those of the template 22 or the device 10 similarly numbered. The template 200 and device 202 are particularly useful in forming graphics on a strip material where the graphics are sufficiently large as to make impractical the use of a circular template 22 according to the first embodiment.

Figure 12:
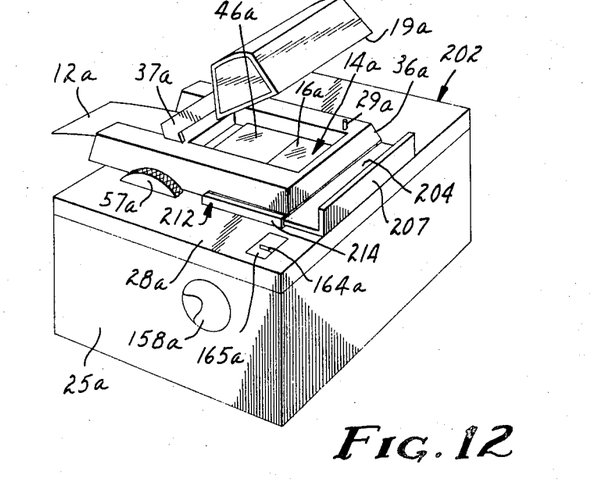
FIG. 12 is a perspective view of a device for forming graphics utilizing the template according to the present invention shown in FIG. 11.

The mechanism of the device 202 is similar to that of the device 10, except that those portions of the device 10 which registered a window 20 of the circular template 22 at the exposure station 14 have been deleted, and means are provided for removably mounting the template 200 on the device 202 to register a window 20a therein at the exposure station 14a.

The template 200 comprises a generally U-shaped template frame 204 including two parallel legs 206 joined by an end member 207 having a slip to facilitate handling of the template 200. A thin radiation transparent supporting layer 126a is attached as by adhesive within opposed slots in the legs 206. The supporting layer 126a has a highly reflective coating 127a with a sharply defined open area corresponding to a graphic, which open area defines the radiation transparent window 20a through the template 200. The window 20a illustrated is in the form of the letter "a," but may be in the form of any letter, digit, symbol or picture. The template 200 illustrated is one of a set of templates (not shown) each having a window in the form of a different one of the upper or lower case letters, the digits, or the punctuation marks, and being of the same style and point size. Selected templates from the set may be serially used in the device 202 to form any desired message along a strip material 12a. For each window in the set, the imaginary base line portion is parallel to and at the same location between the legs 206 of the template frame 204, and the left edge of the window 20a is spaced the same distance from the adjacent edge of the end member 207.

A portion of the supporting layer 126a adjacent the left side of the window 20a is not coated to provide a viewing area 210 through the template 200. The template 200 has a mark 132a in the viewing area. The mark 132a is oriented normal to the imaginary base line portion for the window 20a, and is spaced from the left edge of the window 20a by a predetermined distance equal either to the horizontal width of the window 20a plus a predetermined spacing desired between adjacent graphics formed along the strip material 12a, or a distance equal only to the desired spacing. The mark 132a and the position of the left edge of each window 20a facilitate use of the novel means for allowing the operator to establish a predetermined desired spacing between graphics formed along the strip material 12a as was previously described.

The means for mounting the template 200 in the device 202 include a receiving frame having opposed parallel generally C-shaped channels 214 flanking the exposure station 14a and being parallel to the path of the strip material 12a. The channels 214 are adapted to slidably receive the legs 206 of the template frame 204 and afford movement of the portion of the supporting layer 126a under the first support member 36a to locate the window 20a under the transparent plate 16a and the viewing area 210 under the glass 46a. The position of the left edge of the window 20a at the exposure station 14a in a direction parallel with the path for the strip material 12a is determined by abutment of the distal end of the legs 206 with stops in the channels 214. The template 200 is releasably retained in the channels 214 by springs mounted in the channels 214 (not shown) for releasable engagement with notches 220 along the legs 206.

The device also includes vertical alignment means for adjusting the predetermined line at which the imaginary base line portions of a window 20a at the exposure station 14a is located with respect to the width of the strip material 12a.

The receiving frame 212 is slidably mounted on the top wall 28a for limited movement along a path normal to the path for the strip material 12a. Such movement is provided by rotation of the knob 158a mounted in the front wall 25a to move a nut attached to the receiving frame 212 along a threaded rod extending from the knob (not shown) to position the frame 212 as desired. The position of the receiving frame 212 is indicated by the position of a blade 164a attached to the receiving frame 212 with respect to the dial plate 165a.

Having thus described two embodiments of the present invention, what is claimed is:

1. A template for use in a device to selectively transmit radiant energy in a predetermined pattern for the formation of graphics such as letters, symbols or pictures in a radiation activatable strip material, said template comprising:

a thin flexible supporting member which is transmissive of heat producing radiant energy;

a coating on one surface of said supporting member, said coating being less than about 0.001 inch thick; being highly reflective of heat producing radiant energy; and having an opening corresponding in shape to a graphic to be formed to provide a radiation transmissive window through said template; and mounting means adapted for engagement with said device to mount said template on said device with said window registered at a predetermined position adjacent said strip material.

2. A template according to claim 1, wherein said coating is of copper and has a smooth specularly reflective surface.

3. A template according to claim 1, wherein said coating is of aluminum and has a smooth specularly reflective surface.

4. A template according to claim 1, wherein said template further includes a thin layer of material adhered to the coating on the side opposite said supporting member to provide abrasion protection for said coating.

5. A template according to claim 2 wherein the thickness of said copper coating is about 5,000 Angstroms.

6. A template according to claim 1, wherein said template is circular and has a plurality of radiation transmissive windows arranged in a circular array disposed concentrically about the center of said template.

7. A template adapted for use at the exposure station of a device to selectively transmit radiant energy in a predetermined pattern for the formation of visible graphics such as letters, symbols or pictures in a radiation activatable strip material, said device including drive means for driving the strip material along a path toward a first side of the exposure station, said template comprising a transparent supporting member which is transmissive of heat producing radiant energy; a coating on one surface of said supporting member, said coating being highly reflective of heat producing radiant energy, having an opening corresponding in shape to a graphic to be formed to provide a radiation transmissive window through said template, and having a viewing opening closely spaced from one side of said window to afford visual inspection of a graphic on said strip material adjacent said window;
a mark in said viewing opening spaced a predetermined distance from the adjacent extremity of said window; and mounting means adapted for engagement with said device to mount said template on said device with said window adjacent said strip material at said exposure station and said extremity at a predetermined line transverse of said path on the first side of said exposure station; said mark being positioned to provide a visual indication of the proper positioning along said path of a graphic formed through said template to provide a predetermined spacing between that graphic and the next graphic formed along said strip material.

8. A template according to claim 7, wherein said predetermined distance is measured between said extremity and said mark and is a distance equal to said predetermined spacing.

9. A template according to claim 7, wherein said predetermined distance is measured between said extremity and said mark and is a distance equal to said predetermined spacing plus the width of said graphic from said one side to the opposite side thereof.

10. A template for use in a device to selectively transmit radiant energy in a predetermined pattern for the formation of graphics such as letters, symbols or pictures in a radiation activatable strip material; said template comprising:
a supporting member which is transmissive of heat producing radiant energy;
a specularly reflective metallic coating on said supporting member, said coating being less than about 0.001 inch thick and having a plurality of openings corresponding in shape to graphics to be formed to provide radiation transmissive windows through said template said windows being arranged in inner and outer concentric circular arrays, said coating having an opening beside each of the windows of said inner array between said inner and outer arrays to afford visual inspection of said strip material through said supporting member; and
mounting means adapted for engagement with said device to mount said template on said device with one of said windows registered at a predetermined position adjacent said strip material.

11. A template according to claim 10, wherein said supporting member is a sheet of about 0.007 inch thick polyester, and metallic coating is of copper about 5,000 Angstroms thick.

12. A template according to claim 10, wherein said metallic coating is of aluminum.

13. A template according to claim 11 wherein said template further includes a thin layer of material adhered to the coating on the side opposite said supporting member to provide abrasion and corrosion protection for said metallic coating.

14. A template for use in a device to selectively transmit radiant energy in a predetermined pattern for the formation of graphics such as letters, symbols or pictures in a radiation activatable strip material, said template comprising:
a circular transparent supporting member which is transmissive of heat producing energy;
a thin coating on one surface of said supporting member, said coating being highly reflective of heat producing radiant energy; having a plurality of openings corresponding in shape to a graphic to be formed to define radiation transmissive windows through said template, said windows being arranged in inner and outer circular arrays disposed concentrically about the center of said circular member; and having an annular opening between said inner and outer arrays to afford visual inspection of a said strip material through said circular member; and
mounting means adapted for engagement with said device to mount said template on said device with one of said windows registered at a predetermined position adjacent said strip material.

15. A template according to claim 14, wherein said coating is of copper and has a smooth specularly reflective surface.

16. A template according to claim 15, wherein the thickness of said copper coating is about 5,000 Angstroms.

17. A template according to claim 14, wherein said coating is of aluminum and has a smooth specularly reflective surface.

* * * * *

UNITED STATES PATENT OFFICE
CERTIFICATE OF CORRECTION

Patent No. 3,828,359    Dated August 6, 1974

Inventor(s) Peter J. Vogelgesang et al.

It is certified that error appears in the above-identified patent and that said Letters Patent are hereby corrected as shown below:

Column 3, line 66, delete "vertical cross". Column 4, line 24, after "reference" insert -- which application is now abandoned in favor of continuation-in-part application Serial No. 406,548 filed on October 15, 1973 --; line 54, "a window" should read -- one of the windows --. Column 6, line 18, after "support" insert -- member --. Column 11, line 40, "slip" should read -- lip --.

Signed and sealed this 19th day of November 1974.

(SEAL)
Attest:

McCOY M. GIBSON JR.
Attesting Officer

C. MARSHALL DANN
Commissioner of Patents